(12) United States Patent  (10) Patent No.: US 8,720,983 B1
Edwards et al.  (45) Date of Patent: May 13, 2014

(54) NARROW OFFSET ENERGY MANAGEMENT FRAME STRUCTURE

(71) Applicant: Honda Motor Co., Ltd., Tokyo (JP)

(72) Inventors: David M. Edwards, Marysville, OH (US); Takashi Nakano, Columbus, OH (US); Eric M. Heitkamp, Columbus, OH (US); Patrick J. Ellison, Dublin, OH (US); Brian Christopher Bray, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/828,951

(22) Filed: Mar. 14, 2013

(51) Int. Cl.
*B62D 25/08* (2006.01)

(52) U.S. Cl.
USPC .................................. 296/203.02; 296/187.09

(58) Field of Classification Search
USPC .............. 296/187.09, 187.1, 193.09, 203.02, 296/19.06, 29, 205, 198, 203.01, 204, 296/187.03; 180/312, 291
See application file for complete search history.

(56) References Cited

U.S. PATENT DOCUMENTS

| | | | |
|---|---|---|---|
| 7,219,954 B2 | 5/2007 | Gomi et al. | |
| 7,441,819 B2 | 10/2008 | Azzouz et al. | |
| 7,469,956 B2 | 12/2008 | Yasuhara et al. | |
| 7,845,716 B2 | 12/2010 | Kiyotake et al. | |
| 8,002,337 B2 | 8/2011 | Baccouche et al. | |
| 8,002,338 B2 | 8/2011 | Yasuhara et al. | |
| 8,256,831 B2 | 9/2012 | Abe et al. | |
| 2005/0127717 A1* | 6/2005 | Uchida | 296/203.02 |
| 2006/0006699 A1* | 1/2006 | Matsuyama et al. | 296/203.02 |

* cited by examiner

*Primary Examiner* — Joseph Pape
(74) *Attorney, Agent, or Firm* — Rankin, Hill & Clark LLP (57) ABSTRACT

A front vehicle body structure includes a front pillar that extends in a longitudinal direction of a vehicle body, an upper frame that extends from the front pillar toward a front of a vehicle body, and a front side frame that is disposed laterally interior of the upper frame. The front side frame includes an outer face that faces laterally outward, an inner face that faces laterally inward, and an upper face that connects the inner face to the outer face. The front vehicle body structure also includes a connection member that extends upwardly from the upper face of the front side frame to the upper frame so as to connect the front side frame and the upper frame together.

20 Claims, 5 Drawing Sheets

NARROW OFFSET ENERGY MANAGEMENT FRAME STRUCTURE

BACKGROUND

Current standard frontal crash tests include full frontal or moderate overlap frontal (e.g., 40% offset). Frontal impacts with less than 40% offset and corner impacts have previously received less attention at least with respect to standard crash tests. The small overlap or narrow offset frontal crash test (e.g., 25% offset) is a newly emerging crash requirement associated with frontal impacts with less than 40% offset and corner impacts. This test is designed to replicate what happens when the front corner of a vehicle collides with another vehicle or an object like a tree or a utility pole.

Most vehicles have safety cages that encapsulate the occupant compartment and are built to withstand head-on collisions and moderate overlap frontal crashes with little deformation. At the same time, crush zones help manage crash energy to reduce forces on the occupant compartment. However, the main crash-zone structures are typically concentrated in the middle 50% of the front end. As such, when a crash involves these structures, the occupant compartment is protected from intrusion and the airbags and safety belts cooperate to restrain and protect the occupants. However, the small overlap frontal crashes primarily affect a vehicle's outer edges, which are generally not as well protected by the crush-zone structures. As such, crash forces can go directly into the front wheel, suspension system, and firewall.

BRIEF DESCRIPTION

In accordance with one aspect, a front vehicle body structure includes a front pillar that extends in a longitudinal direction of vehicle body, an upper frame that extends from the front pillar toward a front of a vehicle body, and a front side frame that is disposed laterally interior of the upper frame. The front side frame includes an outer face that faces laterally outward, an inner face that faces laterally inward so as to be opposite the outer face, and an upper face that connects the inner face to the outer face. The front vehicle body structure also includes a connection member that upwardly extends from the upper face of the front side frame to the upper frame to connect the front side frame and the upper frame together. The connection member includes a lower inner wall flange that extends along and is attached to the inner face of the front side frame so as to connect the connection member to the front side frame.

According another aspect, a front vehicle body structure includes a damper housing that is adapted to receive a suspension element, an upper frame that is disposed laterally exterior to the damper housing and extends longitudinally toward a front of a vehicle body. The front vehicle body structure also includes a front side frame that is disposed laterally interior to the upper frame. The front side frame includes an outer face that faces laterally outward, an inner face that faces laterally inward so as to be opposite the outer face, and an upper face that connects the inner face to the outer face so as to face upwardly. The front vehicle body structure also includes a connection member that connects the front side frame and the upper frame to one another. The connection member includes a front wall that faces the front of the vehicle body, a rear wall that is opposite the front wall, and an inner wall that connects the front wall to the rear wall. The connection member also includes a front wall flange that longitudinally extends from the front wall toward the front of the vehicle body, a rear wall flange that longitudinally extends from the rear wall away from the front of the vehicle body, and a lower inner wall flange that laterally extends from the inner wall along the inner face of the front side frame. The front and rear wall flanges directly connect the upper face of the front side frame with the respective front and rear walls of the connection member. The lower inner wall flange directly connects the inner wall of the connection member to the inner face of the front side frame.

According to a further aspect, a method of assembling a front vehicle body structure includes placing an upper frame so as to extend from a front pillar toward a front of a vehicle body, placing a front side frame laterally exterior to the upper frame so that an outer face of the front side frame faces laterally outward, an inner face of the front side frame faces laterally inward so as to be opposite the outer face, and an upper face of the front side frame connects the inner face to the outer face. The method also includes connecting an upper portion of a connection member to the upper frame, and connecting a lower portion of the connection member to the upper face of the front side frame so that a lower inner wall flange of the connection member that extends along the inner face of the front side frame is directly attached to the inner face and a front side frame flange of the front side frame that upwardly extends from the outer face contacts an outer wall of the connection member.

DETAILED DESCRIPTION

It should be understood that the descriptions and drawings herein are merely illustrative and that various modifications and changes can be made in the structures disclosed without departing from the present disclosure. In general, the figures of the exemplary vehicle body structure are not scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body disclosed herein are merely terms of art that may vary from one manufacturer to another and should not be deemed to limit the present disclosure.

Figure 1:
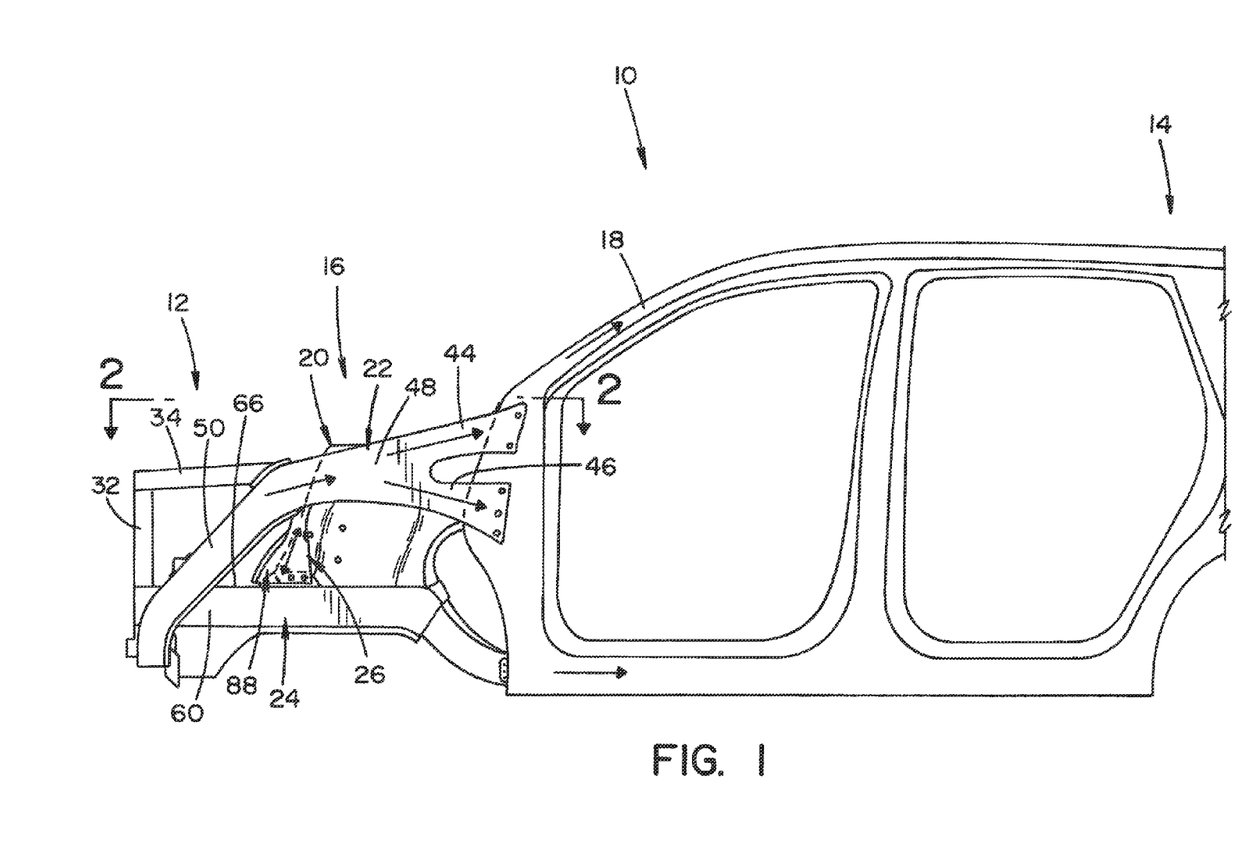
FIG. 1 is an elevation view of a vehicle body that includes a front vehicle body structure.
Figure 2:
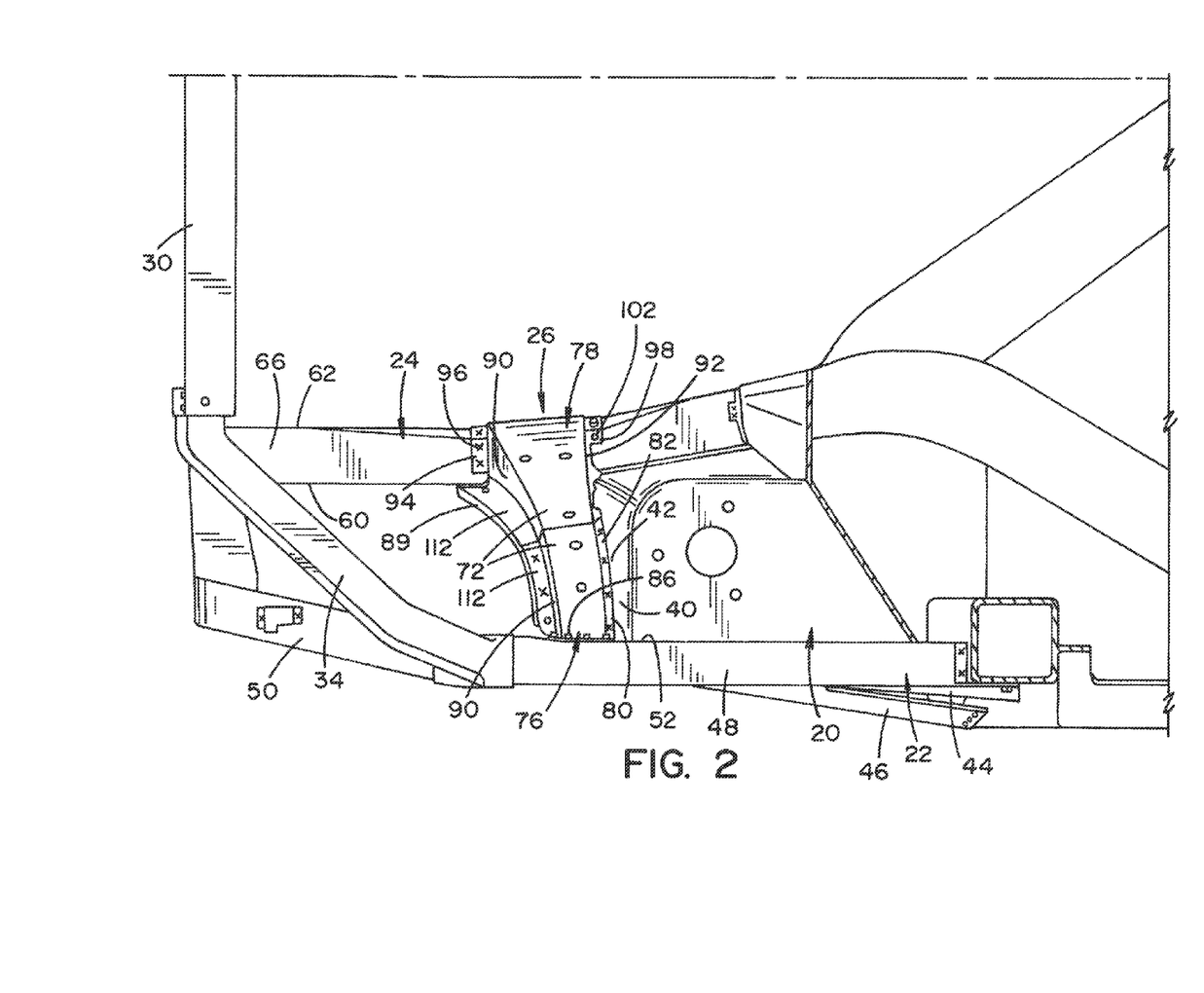
FIG. 2 is a partial cross-sectional view of the vehicle body taken along lines 2-2 of FIG. 1.
Figure 3:
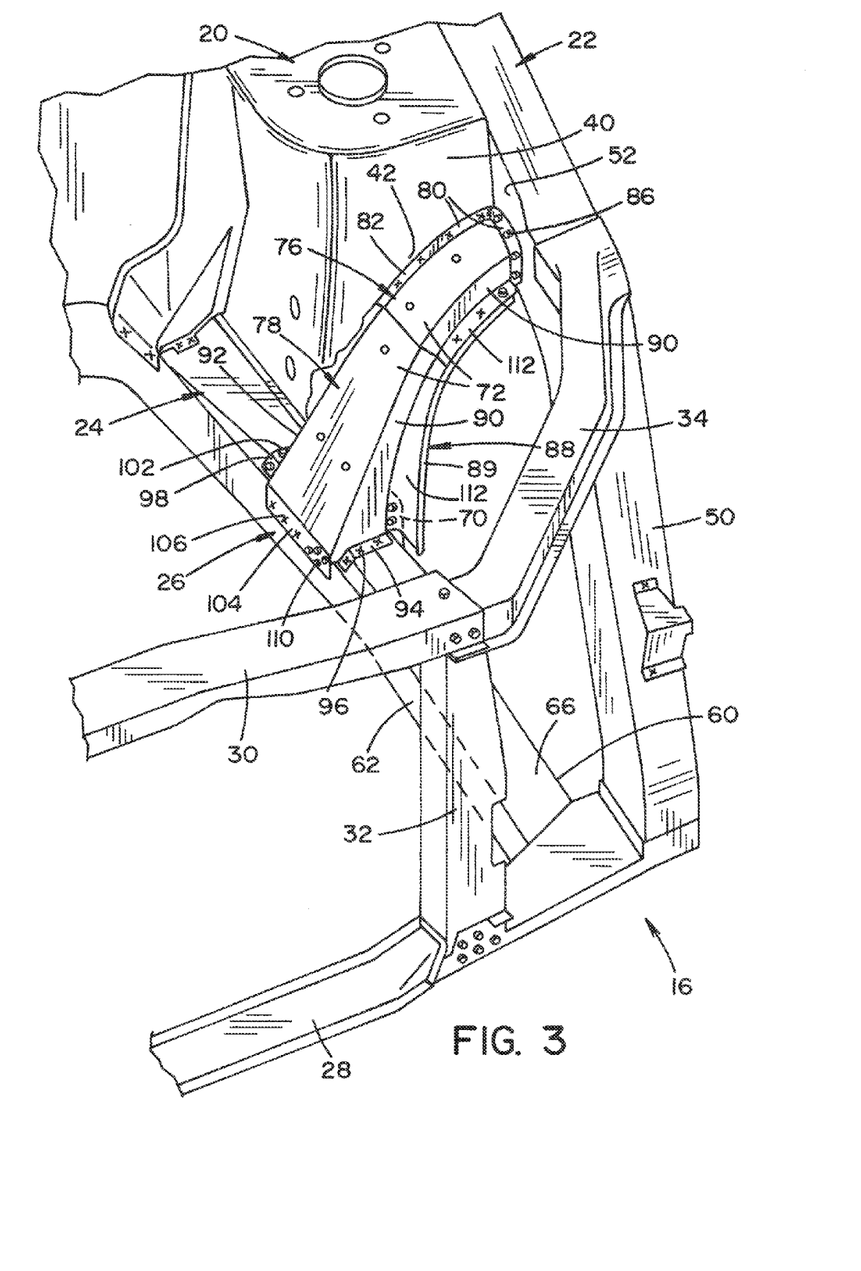
FIG. 3 is a partial perspective view of the front vehicle body structure of FIG. 1.

Referring now to the drawings, wherein like numerals refer to like parts throughout the several views, FIG. 1 illustrates a vehicle body 10 with a front 12 and a rear 14. Located near the front 12 is a front vehicle body structure 16. As shown in FIGS. 1-3, the front vehicle body structure 16 can include a front pillar 18, a damper housing 20, an upper frame 22, a front side frame 24, and a connection member 26. The front vehicle body structure 16 can also include a front beam 28, an upper beam 30, a support member 32, and a crossmember 34.

As is considered apparent, the various components of the front vehicle body structure 16 can be made of any number of materials. For example, it is envisioned that the front vehicle body structure 16 could be made of different types of aluminum or steel. For example, the components of the front vehicle body structure 16 could be made of high-tensile cold-rolled steel with sufficient tensile strength to ensure vehicle occupant safety. Further, the components of the front vehicle body structure 16 can also be made of a combination of multiple grades of steel.

With reference to FIG. 1, the front pillar 18 extends in a longitudinal direction of the vehicle body 10 (i.e., between the back 14 and the front 12). As shown by the arrows in FIG. 1, the front vehicle body structure 16 allows for collision energy to be distributed through the upper frame 22 into the front pillar 18 and along a side sill (not shown). For reference, the door side sill and a frame rail (not shown) typically extend longitudinally along the region below where a door would be received by the vehicle body 10 to further channel the collision energy rearward. By distributing the energy in this manner, collapse of the cabin area of the vehicle body 10 is minimized, thereby ensuring occupant safety.

Figure 4:
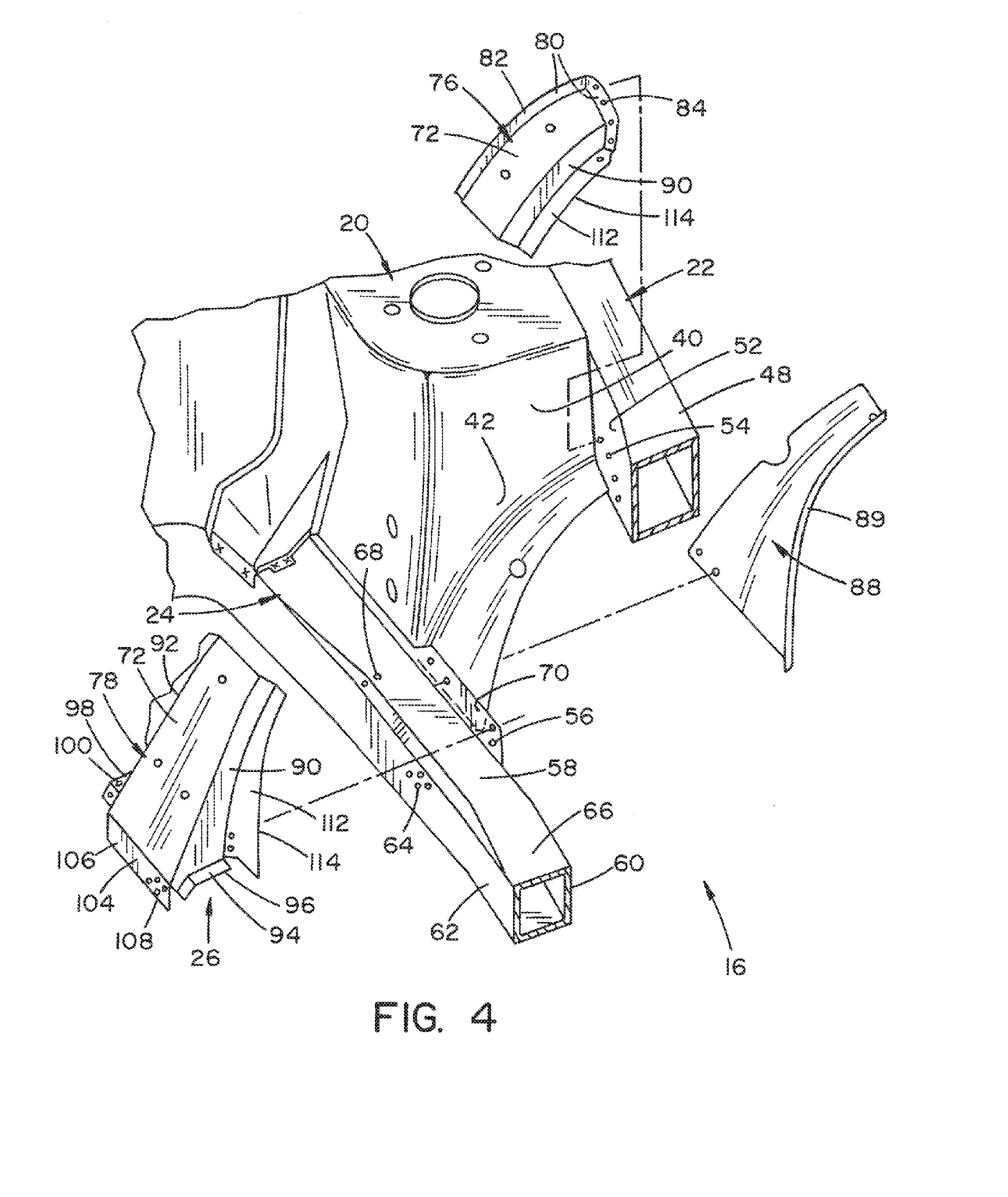
FIG. 4 is a partial perspective exploded view of the front vehicle body structure of FIG. 3.

As illustrated in FIGS. 3-4, the damper housing 20 is adapted to receive a suspension element (not shown), such as a strut. The damper housing 20 can include a forward wall 40 that faces toward the front 12 of the vehicle body 10. The forward wall 40 may include a forward wall weld portion 42 as will be described in more detail hereinafter.

With reference to FIGS. 1-4, the upper frame 22 longitudinally extends from the front pillar 18 toward the front 12 of the vehicle body 10. The upper frame 22 can be laterally exterior to the damper housing 20. The upper frame 22 includes a first leg 44 and a second leg 46. This arrangement allows impact energy which is received by the upper frame 22 to be distributed through the front pillar 18 and along the side sill as previously described. As noted hereinbefore, this energy distribution, as illustrated by the arrows in FIG. 1, ensures that the vehicle occupant remains safe in the event of a crash.

The upper frame 22 includes an upper part 48 and a sloped part 50. The upper part 48 and the sloped part 50 can be both laterally exterior to the damper housing 20. The sloped part 50 longitudinally extends from the upper part 48 toward the front 12 of the vehicle body 10 and is disposed vertically lower than the upper part 48.

As best shown in FIGS. 3-4, the upper frame 22 can include an inner surface 52. The inner surface 52 faces laterally inward toward the connection member 26 and can be generally planar. The inner surface 52 defines inner surface holes 54 as will be described in more detail hereinafter. As illustrated, the upper frame 22 is of a closed cross-sectional shape.

With reference to FIGS. 1-3, the front vehicle body structure 16 can also include the front beam 28. As shown in FIG. 3, the front beam 28 extends laterally inward from the front side frame 24. The front vehicle body structure 16 can also include the upper beam 30 which may be generally parallel to the front beam 28. As illustrated in FIG. 3, the front beam 28 and the upper beam 30 are connected by the support member 32 which extends in a generally vertical direction between these components.

With continued reference to FIGS. 1-3, the front vehicle body structure 16 can also include the crossmember 34 that extends between the upper frame 22 and a juncture point of the support member 32 and the upper beam 30. The crossmember 34 can be integral or separate from the upper frame 22. As illustrated, the front beam 28, the upper beam 30, the support member 32, and the crossmember 34 are joined together by various types of fasteners. However, it will be appreciated that other methods of joining these members could be utilized without departing from the scope of this disclosure. The components 28, 30, 32, 34 may be of an open or closed form shape.

With particular attention to FIGS. 2-4, the damper housing 20 can be positioned so as to be laterally between the front side frame 24 and the upper frame 22. Further, the front side frame 24 is disposed so as to be laterally interior from the upper frame 22. The front side frame 24 may be of a closed cross-sectional shape. For reference, when a component is described as being laterally interior from an object, it will be understood that the component is closer to a longitudinally extending center-line of the vehicle body 10 (the center-line extending between the front 12 and the rear 14) than the object.

With specific reference to FIGS. 3-4, the front side frame 24 includes an outer face 60 that faces laterally outward toward the inner surface 52 of the upper frame 22. The front side frame 24 also includes an inner face 62 that faces laterally inward so as to be opposite the outer face 60. For reference, the inner face 62 is laterally interior from the outer face 60 of the front side frame 24. The inner face 62 defines inner face holes 64 as will be described in more detail hereinafter.

The front side frame 24 also includes an upper face 66 that connects the outer face 60 to the inner face 62 so as to face in an upper direction. The upper face 66 can define holes 68 and upper face weld portions 58. The holes 68 and weld portion 58 can be used to attach the connection member 26 to the front side frame 24 as will be described hereinafter. Although both the holes 68 and the upper face weld portions 58 are illustrated, it will be appreciated that the holes could be absent and solely the weld portions could be used to secure the components.

With specific reference to FIG. 4, the front side frame 24 can further include a front side frame flange 70. The front side frame flange 70 extends upwardly from the outer face 60 of the front side frame 24. The front side frame flange 70 can define holes 56 that extend in a generally lateral direction. These holes 56 can be used for connection with the connection member 26 as will be described in more detailed hereinafter.

With reference to FIGS. 2-4, the connection member 26 upwardly extends from the upper face 66 of the front side frame 24 to the inner surface 52 of the upper frame 22 in a lateral manner. Thus, the connection member 26 interconnects the upper frame 22 and the front side frame 24 together. More particularly, the connection member 26 is connected to the upper part 48 of the upper frame 22 and to multiple locations of the front side frame 24. These connections ensure that the impact energy received by the front beam 28 during a front offset collision is transmitted rearwardly as shown in FIG. 1.

With specific reference to FIG. 4, the connection member 26 includes an upper portion 76 and a lower portion 78 which at least partially overlaps one another. This overlapping of the portions 76, 78 helps maximize the strength of the connection member 26 to ensure that the impact energy is rearwardly transmitted in the event of a front offset collision. As will be described in more detail hereinafter, it will be understood that the upper portion 76 and the lower portion 78 cooperate to define the connection member 26 and share many of the same elements. For example, the inner wall 72 extends along the upper portion 76 and the lower portion 78.

Further, the upper portion 76 and the lower portion 78 cooperate to extend in a curved manner between the front side frame 24 and the upper frame 22 in a lateral direction. This curved shape of the connection member 20 ensures that there is adequate space in the wheel well to accommodate a tire and wheel, while still positively linking the upper frame 22 and the front side frame 24 together.

The upper portion 76 is attached to the upper frame 22 by way of an upper portion flange 80. The upper portion flange 80 is also connected to the damper housing 20 along a forward wall weld portion 42 of the forward wall 40, as shown in FIG. 3. Thus, the upper flange 80 serves to connect the damper housing 20 to the upper frame 22. Additionally, the upper portion flange 80 allows for connection between the damper housing 20, the upper frame 22, and the front side frame 24. By tying the components together in this manner, the impact energy can be properly distributed.

As illustrated in FIG. 3, the upper portion flange 80 directly contacts the inner surface 52 of the upper frame 22. The upper portion flange 80 includes a weld region 82 and defines holes 84. The weld region 82 of the upper portion flange 80 is aligned with the forward wall weld portion 42 of the damper housing 20. Additionally, the upper flange holes 84 are in registry with the inner surface holes 54 of the inner surface 52 of the upper frame 22 so as to receive upper frame fasteners 86. By having both welded and bolted connections, superior connection strength between the components is ensured. It will be understood that the holes could be replaced with weld regions without departing from the scope of this disclosure.

The connection member 26 can also include a front wall 90 that faces toward the front 12 of the vehicle body 10 and a rear wall 92 that faces away from the front 12 of the vehicle body 10. The rear wall 92 is disposed longitudinally opposite from the front wall 90 and is longitudinally behind the front wall 90. The walls 90, 92 can be generally planar in shape.

As shown in FIG. 3, a longitudinal distance between the front wall 90 and the rear wall 92 is greater near a junction of the connection member 26 and the front side frame 24 than a longitudinal distance between the front wall 90 and the rear wall 92 near a junction of the connection member 26 and the upper frame 22. By increasing a distance between the front wall 90 and the rear wall 92 near the front side frame 24, a footprint of the connection member 26 is increased, thereby providing superior connection strength between the components.

The connection member 26 includes an inner wall 72 which faces laterally inward. As illustrated, the inner wall 72 laterally extends between the upper frame 22 and the front side frame 24. The inner wall 72 connects the front wall 90 with the rear wall 92. As is considered apparent, the inner wall 72 is provided on both the upper portion upper portion 76 and the lower portion 78.

As shown in FIGS. 3-4, an outer wall 88 of the connection member 26 is disposed laterally outward from the inner wall 72. The outer wall 88 can include an outer wall flange 89 that laterally extends toward the front side frame 24. The outer wall flange 89 can extend along a front edge of the outer wall 88. The inner wall 72, outer wall 88, front wall 90, and rear wall 92 cooperate to define a closed cross-sectional shape, when cut along a horizontally oriented plane, for the connection member 26.

The inner wall 72 can be spaced from the outer wall 88 near the front side frame 24 a distance that is greater than a distance between the inner wall 72 and the outer wall 88 near the upper frame 22. This spacing between the inner wall 72 and the outer wall 88 near the front side frame 24 is to maximize strength of the connection between the connection member 26 and the front side frame 24.

The connection member 26 can also include a front wall flange 94 that longitudinally extends from the front wall 90 toward the front 12 of the vehicle body 10. The front wall flange 94 includes a weld portion 96 that is aligned with the upper face weld portion 58 of the front side frame 24.

The connection member 26 may also include a rear wall flange 98 that longitudinally extends from the rear wall 92 in a direction away from the front 12 of the vehicle body 10. The rear wall flange 98 defines holes 100 that are in registry with the upper face holes 68 of the upper face 66 of the front side frame 24. These holes 68, 100 can receive rear wall flange fasteners 102. The front and rear wall flanges 94, 98 can directly connect the upper face 66 of the front side frame 24 with the respective front and rear walls 90, 92 of the connection member 26. As will be understood, the holes and fasteners could be replaced with welded connections.

The connection member 26 may also include a lower inner wall flange 104 that extends from the inner wall 72 along the inner face 62 of the front side frame 24. The lower inner wall flange 104 can directly contact the inner face 62 so as to connect the connection member 26 to the front side frame 24. The lower inner wall flange 104 cooperates with the front side frame flange 70 to secure the connection member 26 to the front side frame 24 on opposite lateral sides of the connection member 26. By having a flange extend from each of the components on opposite sides, the connection strength between the connection member 26 and the front side frame 24 is improved.

The lower inner wall flange 104 defines a weld portion 106 as shown in FIG. 4. The lower inner wall flange 104 also defines holes 108 that are located longitudinally forward of the weld portion 106. The holes 108 are in registry with the inner face holes 64 of the front side frame 24 so as to receive lower inner wall flange fasteners 110. FIGS. 2-4 reveal that the connection member 26 and the front side frame 24 are also attached to one another with the alternating weld and fastener arrangement similar to the alternating arrangement between the connection member 26 and the upper frame 22. As noted hereinbefore, this arrangement ensures maximum connection strength between the components. As also previously noted, the holes could be replaced by weld portions without departing from the scope of this disclosure.

With reference to FIGS. 3-4, the connection member 26 can also include an auxiliary wall 112. The auxiliary wall 112 longitudinally extends from the front wall 90 toward the front 12 of the vehicle body 10. As is considered apparent, the auxiliary wall 112 extends along the upper portion 76 and the lower portion 78. The auxiliary wall 112 is disposed laterally interior from the outer wall 88. Further, the auxiliary wall 112 extends from the front side frame 24 to the upper frame 22 with a curvature that is the same as a curvature of the outer wall 88 which extends from the front side frame 24 to the upper frame 22. This curvature matching between the auxiliary wall 112 and the outer wall 88 ensures maximum strength of the connection member 26. The auxiliary wall 112 has a thickness (i.e., lateral distance) that is less than a lateral extension of the outer wall flange 89. Thus, when the inner wall 72 and the outer wall 88 are assembled, the outer wall flange 89 protects and covers a forwardly facing edge 114 of the auxiliary wall 112. Accordingly, a robust connection between the inner wall 72 and the outer wall 88 is ensured, thereby increasing an overall strength of the connection member 26.

Figure 5:
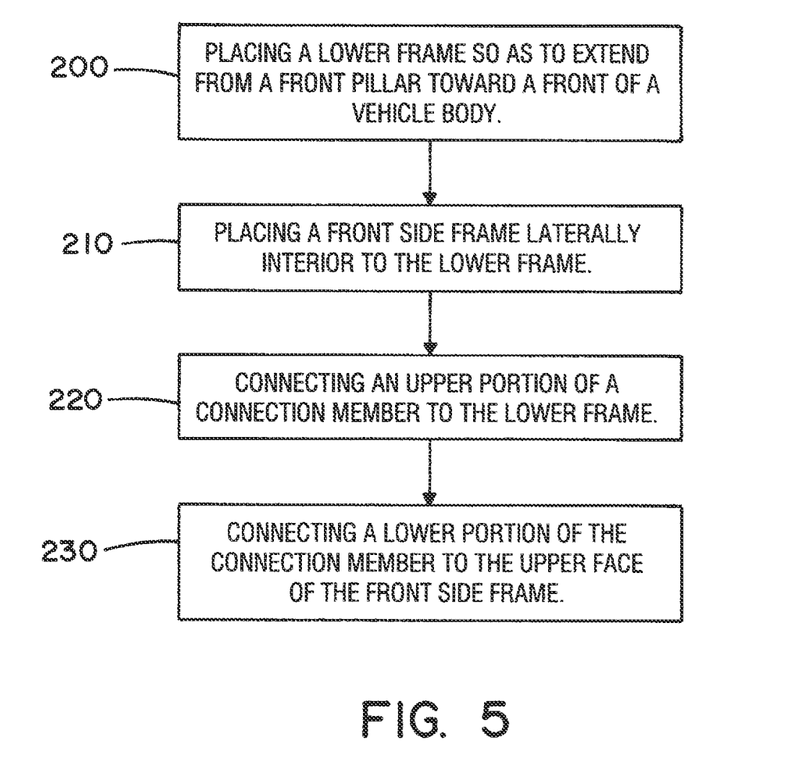
FIG. 5 is a flowchart illustrating a method of assembling the front vehicle body structure.

With particular reference to FIG. 5, a method of assembling the front vehicle body structure 16 is shown. In 200, the upper frame 22 is placed so as to extend from the front pillar 18 toward the front 12 of the vehicle body 10. In 210, the front side frame 24 is placed laterally interior to the upper frame 22 so that the outer face 60 of the front side frame 24 faces laterally outward, the inner face 62 of the front side frame 24 faces laterally inward so as to be opposite the outer face 60, and the upper face 66 of the front side frame 24 connects the inner face 62 to the outer face 60. In 220, the upper portion 76 of the connection member 26 is connected to the upper frame 22.

In 230, the lower portion 78 of the connection member 26 is connected to the upper face 66 of the front side frame 24 so that the lower inner wall flange 104 of the connection member 26 extends along the inner face 62 of the front side frame 24 and is directly attached to the inner face 62, and the front side frame flange 70 of the front side frame 24 that upwardly extends from the outer face 60 contacts the outer wall 88 of the connection member 26.

Further, the connection member 26 can be connected to the front side frame 24 so that the front wall flange 94 (that longitudinally extends from the front wall 90 of the connection member 26 toward the front 12 of the vehicle body 10) and the rear wall flange 98 (that longitudinally extends from the rear wall 92 of the connection member 26 away from the front 12 of the vehicle body 10) directly contact the upper face 66 of the front side frame 24.

While, for purposes of simplicity of explanation, the method has steps shown and described as executing serially, it is to be understood and appreciated that the present disclosure is not limited by the illustrated order, and some steps could occur in different orders and/or concurrently with other steps from that shown and described herein.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A front vehicle body structure, comprising:
   a front pillar extending in a longitudinal direction of a vehicle body;
   an upper frame extending from the front pillar toward a front of the vehicle body;
   a front side frame disposed laterally interior of the upper frame, the front side frame including an outer face facing laterally outward, an inner face facing laterally inward so as to be opposite the outer face, and an upper face connecting the inner face to the outer face; and
   a connection member upwardly extending from the upper face of the front side frame to the upper frame interconnecting the front side frame and the upper frame, the connection member including a front wall facing the front of the vehicle body and a rear wall opposite the front wall, the connection member also including a lower inner wall flange extending along and being attached to the inner face of the front side frame so as to connect the connection member to the front side frame, wherein a longitudinal distance between the front wall and the rear wall of the connection member is greater near a junction of the connection member and the front side frame than a longitudinal distance between the front wall and the rear wall of the connection member near a junction of the connection member and the upper frame.

2. The front vehicle body structure of claim 1, wherein the connection member includes an inner wall from which the lower inner wall flange extends and an outer wall that is opposite the inner wall, the front side frame including a front side frame flange upwardly extending from the outer face contacting the outer wall of the connection member.

3. The front vehicle body structure of claim 2, the connection member including an upper portion attached to the upper frame and a lower portion attached to the front side frame, the upper portion and the lower portion overlapping one another.

4. The front vehicle body structure of claim 2, the connection member including an upper portion attached to the upper frame and a lower portion attached to the front side frame, the upper portion and the lower portion cooperating to curvedly extend between the front side frame and the upper frame.

5. The front vehicle body structure of claim 1, the connection member including an inner wall from which the lower flange extends and an outer wall that is laterally opposite the inner wall, wherein the front wall and the rear wall of the connection member are longitudinally opposite one another, and wherein the inner wall and the outer wall cooperate with the front wall and the rear wall to define a closed cross-sectional shape.

6. The front vehicle body structure of claim 5, the connection member including a front flange longitudinally extending from the front wall toward the front of the vehicle body and a rear flange longitudinally extending from the rear wall away from the front of the vehicle body, the front and rear flanges directly contacting the upper face of the front side frame.

7. The front vehicle body structure of claim 1, further comprising:
   a damper housing being laterally disposed between the upper frame and the front side frame, the connection member including an upper portion with an upper portion flange secured to the damper housing and the upper frame.

8. The front vehicle body structure of claim 7, further comprising:
   a front beam laterally extending inward from the front side frame, wherein the connection member is longitudinally disposed between the damper housing and the front beam.

9. The front vehicle body structure of claim 7, the upper frame including an upper part disposed laterally exterior to the damper housing and a sloped part that longitudinally extends from the upper part toward the front of the vehicle body, wherein the connection member is connected to the upper part of the upper frame.

10. A front vehicle body structure, comprising:
    a damper housing;
    an upper frame disposed laterally exterior to the damper housing and longitudinally extending toward a front of a vehicle body;
    a front side frame disposed laterally interior to the upper frame, the front side frame including an outer face facing laterally outward, an inner face facing laterally inward so as to be opposite the outer face, and an upper face interconnecting the inner face to the outer face so as to face upwardly; and
    a connection member connecting the front side frame and the upper frame to one another, the connection member including a front wall facing the front of the vehicle body, a rear wall opposite the front wall, and an inner wall connecting the front wall to the rear wall, the connection member also including a front wall flange longitudinally extending from the front wall toward the front of the vehicle body, a rear wall flange longitudinally extending from the rear wall away from the front of the vehicle body, and a lower inner wall flange laterally extending from the inner wall along the inner face of the front side frame, the front and rear wall flanges directly connecting the upper face of the front side frame with the respective front and rear walls of the connection member and the lower inner wall flange directly connecting the inner wall of the connection member to the inner face of the front side frame, wherein the front side frame includes a front side frame flange upwardly extending from the outer face of the front side frame to contact an outer wall of the connection member, wherein the outer wall is opposite the inner wall and is disposed laterally interior to the front side frame flange.

11. The front vehicle body structure of claim 10, wherein the front side frame flange cooperates with the lower inner wall flange to secure the connection member to the front side frame on opposite lateral sides of the connection member.

12. The front vehicle body structure of claim 10, the damper housing including a forward wall facing the front of the vehicle body and the connection member including an upper portion flange extending around at least a part of a perimeter of the connection member, the upper portion flange directly contacting the forward wall of the damper housing.

13. The front vehicle body structure of claim 12, the upper frame including an inner surface facing laterally inward toward the connection member, wherein the upper portion flange of the connection member directly contacts the inner surface of the upper frame.

14. The front vehicle body structure of claim 12, the upper frame including an inner surface facing laterally inward toward the connection member, the inner surface defining inner surface holes and the forward wall of the damper housing defining a forward wall weld portion, the upper portion flange defining an upper portion flange weld region and upper portion flange holes, the upper portion flange weld region being aligned with the forward wall weld portion and the upper portion flange holes being in registry with the inner surface holes to receive upper frame fasteners.

15. The front vehicle body structure of claim 10, wherein a longitudinal distance between the front wall and the rear wall of the connection member is greater near a junction of the connection member and the front side frame than a longitudinal distance between the front wall and the rear wall of the connection member near a junction of the connection member and the upper frame.

16. The front vehicle body structure of claim 10, the rear wall flange of the connection member defining rear wall flange holes and the upper face of the front side frame defining upper face holes that are in registry with the rear wall flange holes to receive rear wall flange fasteners, the lower inner wall flange of the connection member defining a lower inner wall flange weld portion and lower inner wall flange holes, the lower inner wall flange holes being disposed longitudinally forward of the lower inner wall flange weld portion, the inner face of the front side frame defining inner face holes that are in registry with the lower inner wall flange holes to receive lower inner wall flange fasteners and the front wall flange defining a front wall flange weld portion that is aligned with an upper face weld portion of the front side frame.

17. The front vehicle body structure of claim 10, the connection member including an auxiliary wall longitudinally extending from the front wall toward the front of the vehicle body, the auxiliary wall being disposed laterally interior from the outer wall, wherein the auxiliary wall extends from the front side frame to the upper frame with a curvature that is the same as a curvature of the outer wall as the outer wall extends from the front side frame to the upper frame.

18. The front vehicle body structure of claim 10, the connection member including an auxiliary wall longitudinally extending from the front wall toward the front of the vehicle body, and an outer wall flange laterally extending toward the front side frame so as to cover a forwardly facing edge of the auxiliary wall.

19. A method of assembling a front vehicle body structure, comprising:
    placing an upper frame laterally exterior to a damper housing so as to extend from a front pillar toward a front of a vehicle body;
    placing a front side frame laterally interior to the upper frame so that an outer face of the front side frame faces laterally outward, an inner face of the front side frame faces laterally inward so as to be opposite the outer face, and an upper face of the front side frame connects the inner face to the outer face;
    placing a connection member with a front wall, a rear wall, and an inner wall so that the front wall of the connection member faces the front of the vehicle body, the rear wall is opposite the front wall and the inner wall connects the front wall to the rear wall;
    connecting an upper portion of the connection member to the upper frame; and
    connecting a lower portion of the connection member to the upper face of the front side frame so that a lower inner wall flange of the connection member that extends along the inner face of the front side frame is directly attached to the inner face and a front side frame flange of the front side frame that upwardly extends from the outer face contacts an outer wall of the connection member, wherein the outer wall is opposite the inner wall and is laterally interior to the front side frame flange.

20. The method of assembling the front vehicle body structure of claim 19, further comprising:
    connecting the connection member to the front side frame so that a front wall flange longitudinally extends from the front wall of the connection member toward the front of the vehicle body and the rear wall flange longitudinally extends from a rear wall of the connection member away from the front of the vehicle body to directly contact the upper face of the front side frame.

* * * * *